(12) United States Patent  
Ueda et al.

(10) Patent No.: US 10,976,177 B2  
(45) Date of Patent: Apr. 13, 2021

(54) NAVIGATION SYSTEM AND NAVIGATION PROGRAM

(71) Applicants: AISIN AW CO., LTD., Anjo (JP); TOYOTA JIDOSHA KABUSHIKI KAISHA, Toyota (JP)

(72) Inventors: Kazuya Ueda, Tsushima (JP); Kazunori Watanabe, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 16/095,443

(22) PCT Filed: May 23, 2017

(86) PCT No.: PCT/JP2017/019168  
§ 371 (c)(1),  
(2) Date: Oct. 22, 2018

(87) PCT Pub. No.: WO2017/208898  
PCT Pub. Date: Dec. 7, 2017

(65) Prior Publication Data  
US 2019/0128692 A1 May 2, 2019

(30) Foreign Application Priority Data  
May 31, 2016 (JP) .............................. JP2016-108602

(51) Int. Cl.  
*G01C 21/36* (2006.01)  
*G06T 19/00* (2011.01)  
(Continued)

(52) U.S. Cl.  
CPC ........... *G01C 21/367* (2013.01); *G01C 21/26* (2013.01); *G01C 21/36* (2013.01);  
(Continued)

(58) Field of Classification Search  
CPC .................... G01C 21/367; G01C 21/3635  
See application file for complete search history.

(56) References Cited

U.S. PATENT DOCUMENTS 9,159,153 B2 * 10/2015 Chen ...................... G06T 17/05  
9,760,243 B2 * 9/2017 De Vallois ........ G01C 21/3676  
(Continued)

FOREIGN PATENT DOCUMENTS

JP          06-139495 A      5/1994  
JP          06-347280 A     12/1994  
(Continued)

OTHER PUBLICATIONS

International Search Report of PCT/JP2017/019168 dated Jul. 25, 2017 [PCT/ISA/210].

*Primary Examiner* — Todd Melton  
(74) *Attorney, Agent, or Firm* — Sughrue Mion, PLLC

(57) ABSTRACT

There is provided a technique for reducing the possibility that a user loses track of how a road, etc., grasped by him/her have been changed on a map. A navigation system includes: a map display part that displays a map on a display in any of a plurality of display modes, the map including a current location; a moving image display part that displays, when the display mode changes, a moving image in which the map is rotated and the display mode before being changed gradually changes to a changed display mode, on the display; and a speed-of-change control part that increases a speed of change in the display mode after start of the change in the display mode.

6 Claims, 3 Drawing Sheets

(51) Int. Cl.
*G09B 29/00* (2006.01)
*G09G 5/36* (2006.01)
*G01C 21/26* (2006.01)
*G09G 5/00* (2006.01)

(52) U.S. Cl.
CPC .......... *G01C 21/3635* (2013.01); *G06T 19/00* (2013.01); *G06T 19/003* (2013.01); *G09B 29/00* (2013.01); *G09G 5/00* (2013.01); *G09G 5/36* (2013.01)

(56) References Cited

U.S. PATENT DOCUMENTS

| | | | | |
|---|---|---|---|---|
| 9,959,641 | B1* | 5/2018 | Olsson | G06F 3/04815 |
| 10,318,127 | B2* | 6/2019 | Shin | G06F 3/04883 |
| 2009/0244100 | A1* | 10/2009 | Schwegler | G06T 15/10 |
| | | | | 345/668 |

FOREIGN PATENT DOCUMENTS

| | | |
|---|---|---|
| JP | 07-77426 A | 3/1995 |
| JP | 08-44996 A | 2/1996 |
| JP | 2008-046237 A | 2/2008 |

\* cited by examiner

NAVIGATION SYSTEM AND NAVIGATION PROGRAM

CROSS REFERENCE TO RELATED APPLICATIONS

This application is a National Stage of International Application No. PCT/JP2017/019168, filed May 23, 2017, claiming priority based on Japanese Patent Application No. 2016-108602, filed May 31, 2016.

TECHNICAL FIELD

Aspects of the application relate to a navigation system and a navigation program.

BACKGROUND ART

Conventionally, there is known a technique for rotating a map so as to change a relationship between a specific direction on the map and a reference direction on a display. For example, Patent Literature 1 discloses a technique for rotating a map so as to switch between a north-up map in which the north on the map is oriented in an upward direction on a display and a head-up map in which a vehicle's traveling direction on the map is oriented in the upward direction on the display. In addition, Patent Literature 1 discloses a configuration in which a map is gradually rotated.

CITATION LIST

Patent Literature

Patent Literature 1: JP 2008-46237 A

SUMMARY OF EMBODIMENTS

Technical Problems

In the above-described conventional art, since a map is gradually rotated, a user can visually identify the process of the rotation. However, the rotation of the map suddenly starts and suddenly ends. If the rotation of the map suddenly starts, then due to a sudden change in the display of the map, the user may lose track of how a road, etc., grasped by him/her have been changed on the map. For example, a situation is assumed in which a map including a current location is displayed on a display part by a navigation system. In this case, the user can grasp the conditions of a road ahead of the current location, intersections around the current location, etc., based on the map. Note, however, that the user using the navigation system does not always continuously gaze at the map displayed on the display part. Therefore, if rotation of the map suddenly starts, then there is a possibility that the user loses track of how the road, intersections, etc., grasped by him/her have been changed on the map.

Aspects of the present application is made in view of the above-described problem, and provides a technique capable of reducing the possibility that a user loses track of how a road, etc., grasped by him/her have been changed on a map.

Solutions to Problems

To provide the above-described technique, a navigation system includes: a map display part that displays a map on a display in any of a plurality of display modes, the map including a current location; a moving image display part that displays, when the display mode changes, a moving image in which the map is rotated and the display mode before being changed gradually changes to a changed display mode, on the display; and a speed-of-change control part that increases a speed of change in the display mode after start of the change in the display mode.

In addition, to provide the above-described technique, a navigation program causes a computer to function as: a map display part that displays a map on a display in any of a plurality of display modes, the map including a current location; a moving image display part that displays, when the display mode changes, a moving image in which the map is rotated and the display mode before being changed gradually changes to a changed display mode, on the display; and a speed-of-change control part that increases a speed of change in the display mode after start of the change in the display mode.

As described above, in the navigation system and program, in a configuration in which the display mode of a map gradually changes, the speed of change in display mode is increased after start of the change in display mode. Therefore, in a moving image in which the display mode of a map gradually changes, the change in display mode is slower at the beginning than afterward. Hence, the possibility that the user loses track of how a road, etc., grasped by him/her have been changed on the map can be reduced.

DESCRIPTION OF EMBODIMENTS

Here, the embodiments will be described in the following order:

(1) Configuration of a navigation system;
(2) Exemplary change in display mode; and
(3) Other embodiments.

(1) CONFIGURATION OF A NAVIGATION SYSTEM

Figure 1:
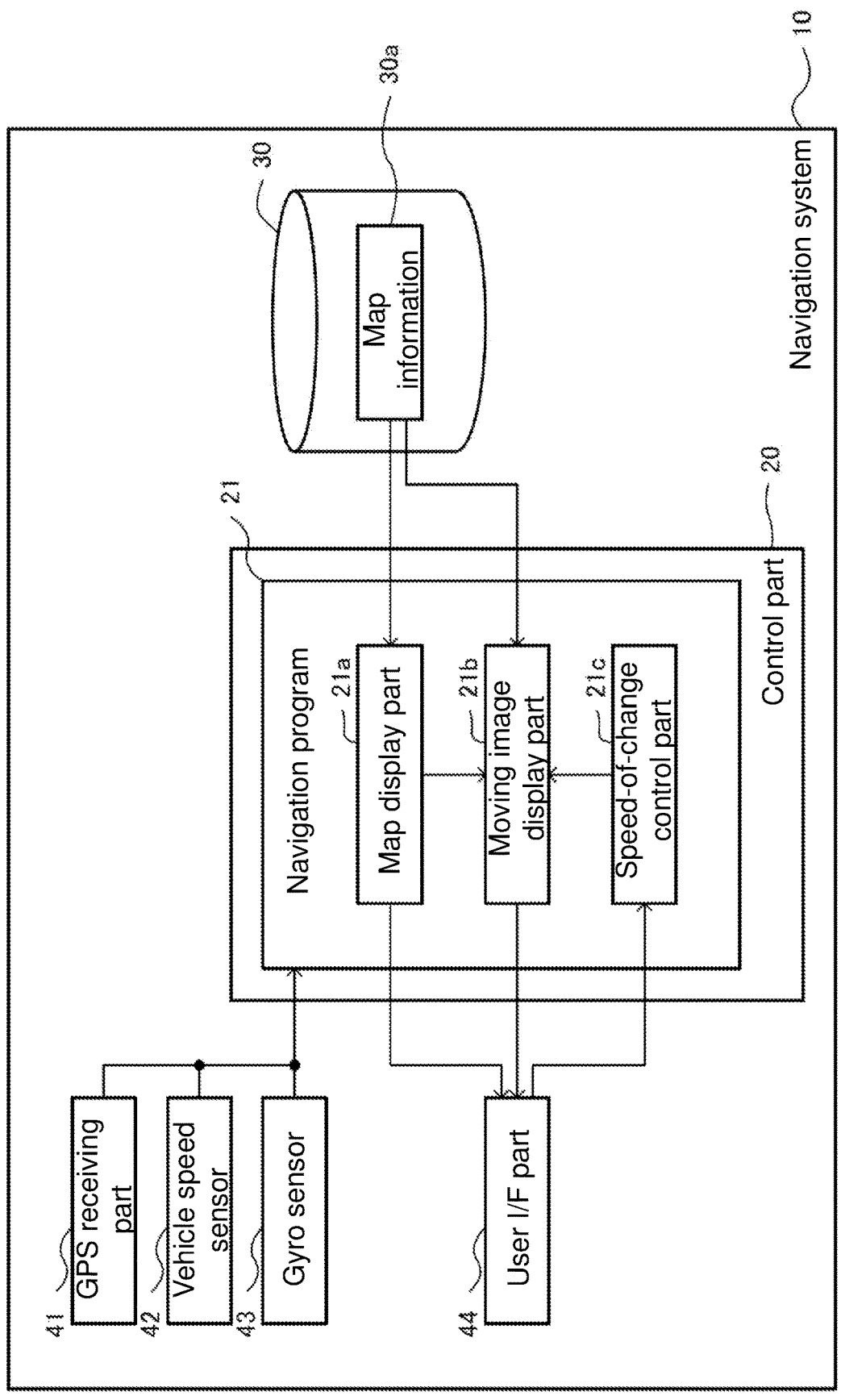
FIG. 1 is a block diagram showing a configuration of a navigation system.

FIG. 1 is a block diagram showing a configuration of a navigation system 10 according to one embodiment. The navigation system 10 includes a control part 20 including a CPU, a RAM, a ROM, etc., and the control part 20 can execute various programs recorded in the ROM or a recording medium 30. In the present embodiment, as one of the programs, a navigation program can be executed.

By a process of the navigation program, the control part 20 can search for a route to reach a destination after departing a current location. In addition, by a process of the navigation program, the control part 20 can provide guidance for guiding a vehicle including the navigation system 10 along the route.

The recording medium 30 has map information 30*a* recorded therein in advance. The map information 30*a* includes node data representing the locations of nodes corresponding to endpoints of a road section; shape interpolation point data representing, for example, the locations of shape interpolation points for identifying the shape of a road between the nodes; link data representing a link between the nodes; facility data representing the locations and attributes of facilities; and the like. The attributes of facilities can be defined in various manners. In the present embodiment, names, the types of facilities, etc., are defined as attributes and associated. Note that, in the present embodiment, rendering data for rendering ground objects (roads, facilities, etc.) on a map is included in the map information 30a.

The navigation system 10 includes a GPS receiving part 41, a vehicle speed sensor 42, a gyro sensor 43, and a user I/F part 44. The user I/F part 44 is an interface part for accepting, as input, user's instructions and providing various types of information to a user, and includes a touch panel type display and an output part for output sound such as a speaker, which are not shown.

The GPS receiving part 41 receives radio waves from GPS satellites, and outputs a signal for calculating a current vehicle location, through an interface which is not shown. The vehicle speed sensor 42 outputs a signal corresponding to the rotational speed of wheels provided on the vehicle. The control part 20 obtains this signal through an interface which is not shown, to obtain vehicle speed. The gyro sensor 43 detects angular acceleration for a turn in a horizontal plane of the vehicle, and outputs a signal corresponding to vehicle's orientation. The control part 20 obtains this signal to obtain a vehicle's traveling direction. The control part 20 obtains a current vehicle location by identifying a vehicle's traveling path based on the output signals from the vehicle speed sensor 42, the gyro sensor 43, and the like. The output signal from the GPS receiving part 41 is used, for example, to correct the current vehicle location identified by the vehicle speed sensor 42, the gyro sensor 43, and the like.

A navigation program 21 of the present embodiment has a function for displaying a map. The navigation program 21 allows the control part 20 to implement a function of displaying a map in a plurality of display modes. To perform the map display, the navigation program 21 includes a map display part 21a, a moving image display part 21b, and a speed-of-change control part 21c. The map display part 21a is a program module that allows the control part 20 to perform a function of displaying a map on the display in any of a plurality of display modes.

In the present embodiment, the control part 20 is capable of rendering maps represented two-dimensionally, and can render maps having different relationships between a specific direction on the map and a reference direction on the display. Namely, in the present embodiment, the rendering data included in the map information 30a is data for reproducing the shapes of ground objects such as roads and facilities on the map. The control part 20 determines the sizes of ground objects based on the map scale by referring to the rendering data, and identifies the locations of roads, facilities, etc., based on the node data, shape interpolation point data, link data, and facility data. Then, the control part 20 generates image data representing a map in which the ground objects with shapes represented by the rendering data are two-dimensionally rendered.

Upon the rendering, the control part 20 can render a map by performing setting such that a current vehicle location is present at a reference position on the display and an arbitrary direction on the map is oriented in an upward direction of the display. Hence, the control part 20 obtains a current vehicle location based on output signals from the GPS receiving part 41, the vehicle speed sensor 42, and the gyro sensor 43. Then, the control part 20 determines a map rendering position such that the current vehicle location overlaps the reference position on the display and the arbitrary direction on the map is oriented in the upward direction of the display, and generates image data representing the map. Note that a vehicle's traveling direction can be identified based on, for example, a history of current vehicle locations.

Upon providing route guidance, etc., the control part 20 renders a map in which either one of a north direction on the map and a vehicle's traveling direction is oriented in the upward direction of the display, and outputs a control signal to the user I/F part 44. As a result, a north-up map in which the north direction on the map is oriented in the upward direction of the display or a head-up map in which the vehicle's traveling direction on the map is oriented in the upward direction of the display is displayed on the display of the user I/F part 44.

The moving image display part 21b is a program module that allows the control part 20 to implement a function of displaying, when the display mode changes, a moving image in which the display mode gradually changes from the one before being changed to a changed one, on the display. Namely, in the present embodiment, the control part 20 can display a map in either one of "north-up" and "head-up" display modes, and provide route guidance, etc. These display modes can be changed by various triggers, e.g., an operation instruction by the user to the user I/F part 44, and the control part 20 switches the display mode from one to another in response to the trigger.

At this time, in the present embodiment, the control part 20 displays the process of changing the display mode using a moving image. Specifically, in the present embodiment, a direction on the map that is oriented in the upward direction of the display differs between maps obtained before and after the display mode is changed. Therefore, in the present embodiment, by rotating the map, the display mode can be changed. Hence, the control part 20 creates a moving image showing a process in which a map before being changed is rotated and turns to a changed map, and plays back the moving image before displaying the map in the changed display mode.

Images showing the process of changing the display mode may be created in any manner as long as the images are created such that the display mode gradually changes. In the present embodiment, the control part 20 creates a moving image by creating images of a predetermined number of frames (e.g., 16 frames; the number of frames may be variable) in a predetermined time period (e.g., 1200 msec; the time period may be variable). Hence, the control part 20 renders a map of each frame such that, in each of the images of the number of frames, a specific direction (e.g., the north direction) is gradually rotated from a direction on the map obtained before the display mode is changed to a direction on the map obtained after the display mode is changed.

The amount of rotation for each frame is determined by a process of the speed-of-change control part 21c. The speed-of-change control part 21c is a program module that allows the control part 20 to implement a function of increasing the speed of change in display mode after start of change in display mode. In the present embodiment, the control part 20 specifies the amount of rotation such that the amount of change in display mode per unit time gradually increases after start of change in display mode, becomes constant, and further gradually decreases.

Specifically, the control part 20 sets the rotation rate of the angle of the map obtained before change in display mode to 0% and sets the rotation rate of the angle of the map obtained after the change to 100%, and determines a change rate for each frame included in the change process. The change rates may be determined by various techniques, and a parameter such as acceleration may be determined, or a map in which frame numbers and change rates are associated with each other may be created in advance. Table 1 is an example of a case in which the change rates are predetermined like the latter one.

TABLE 1

| | Frame | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Rotation rate (%) | 0 | 1 | 4 | 10 | 17 | 25 | 35 | 45 | 55 | 65 | 75 | 83 | 90 | 96 | 99 | 100 |

Note that the angle of the map is defined by, for example, an angle between the specific direction on the map and the upward direction on the display.

Note that an increase in the speed of change may be implemented in any manner as long as the user is not given the impression that change in display mode is suddenly started, and acceleration (the amount of change in angle per unit time) can take various values. In addition, a decrease in the speed of change may be implemented in any manner as long as the user is not given the impression that the change in display mode is suddenly completed, and deceleration (the amount of change in angle per unit time) can take various values.

In the present embodiment, in the above-described manner, an angle of a map is determined so as to obtain a change rate appropriate to each frame, and the map at the angle is rendered. Namely, the control part 20 obtains a current vehicle location based on output signals from the GPS receiving part 41, the vehicle speed sensor 42, and the gyro sensor 43. In addition, the control part 20 determines a map rendering position such that the current vehicle location overlaps the reference position on the display and an angle determined for each frame is obtained, and generates image data representing a map for each frame. As a result, a plurality of images are created that change such that a display mode before being changed approaches a changed display mode, and that are arranged in the order in which the degree of change increases, and the images serve as image data to be played back.

When image data representing a map for each frame is generated, by a process of the moving image display part 21b, the control part 20 displays a moving image by displaying each frame image in turn every certain period. Specifically, the control part 20 outputs a control signal to the user I/F part 44 to erase a map being displayed (i.e., a map in a display mode before being changed). Then, the control part 20 outputs a control signal to the user I/F part 44 to display a moving image on the display by displaying each frame image in turn every certain period. When the playback of the moving image is finished, the control part 20 outputs a control signal to the user I/F part 44 to erase the last image forming the moving image and display a map in a changed display mode.

According to the above-described configuration, it becomes possible to display a moving image in which the speed of change in display mode increases immediately after start of change in display mode, and then becomes constant, and then decreases toward the completion of the change in display mode. Therefore, in a moving image in which the display mode of a map gradually changes, the change in display mode is slower at the beginning of the change than afterward. Hence, the possibility that the user loses track of how a road, etc., grasped by him/her have been changed on the map can be reduced at the beginning. In addition, the change in display mode is slower at the ending of the change than earlier. Hence, the possibility that the user can recognize how the road, etc., grasped by him/her have been changed on the map can be improved at the ending.

(2) EXEMPLARY CHANGE IN DISPLAY MODE

Figure 2A:
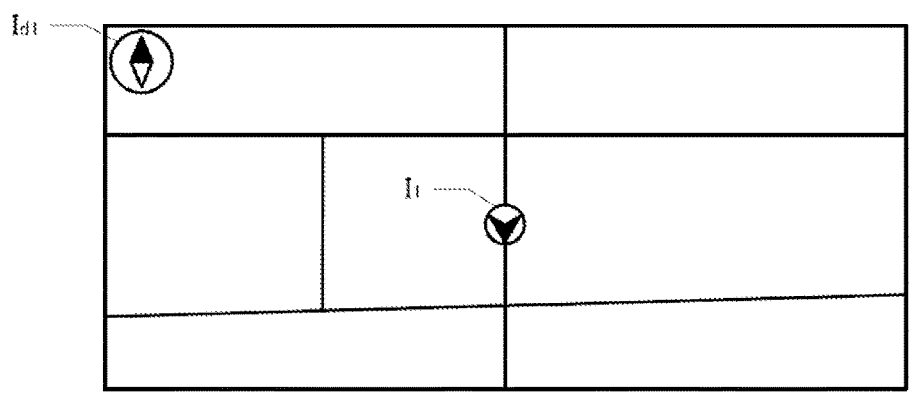
FIGS. 2A, 2B, 2C, and 2D are diagrams describing exemplary map display.

Next, an example case of changing the display mode of a map will be described. FIGS. 2A to 2D show examples of maps displayed on the display of the user I/F part 44. In these drawings, icons $I_1$ to $I_4$ each represent a vehicle location, and icons $I_{d1}$ to $I_{d4}$ each indicate that a direction pointed by a black triangle is the north. In addition, FIG. 2A shows a north-up map in which the north direction on the map is oriented in the upward direction of the display, and FIG. 2D shows a head-up map in which a vehicle's traveling direction on the map is oriented in the upward direction of the display.

Here, an example case in which the display mode changes from the north-up map shown in FIG. 2A to the head-up map shown in FIG. 2D will be described. Namely, when the user provides an instruction to change the display mode with the north-up map shown in FIG. 2A being displayed on the display of the user I/F part 44, the control part 20 creates a moving image showing the change from FIG. 2A to FIG. 2D.

Figure 2B:
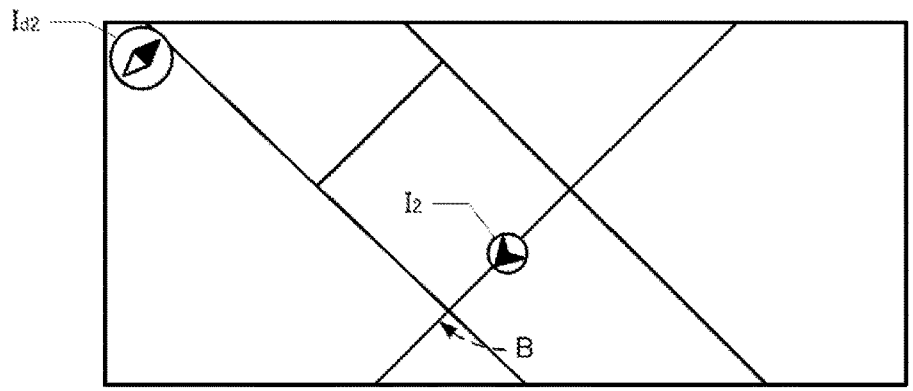
Figure 2C:
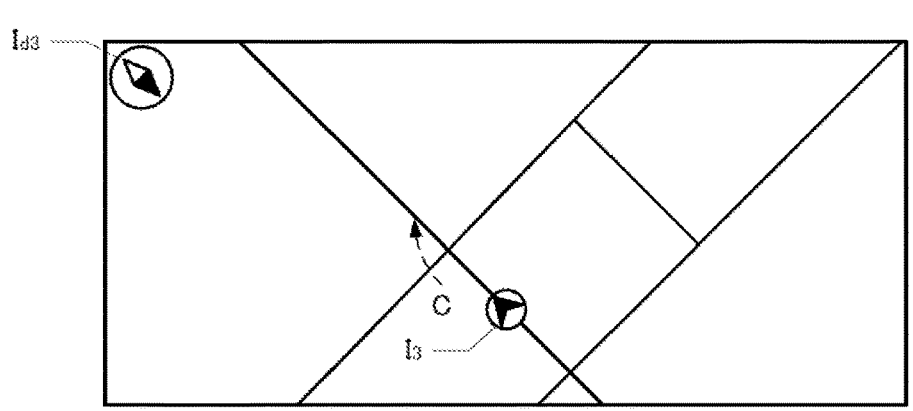
Figure 2D:
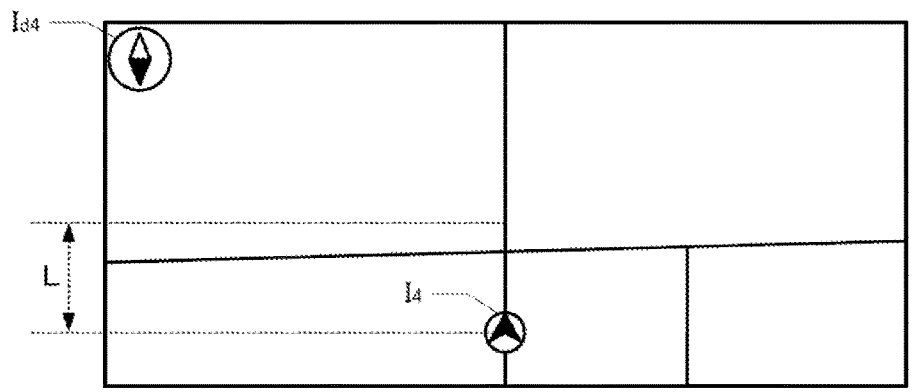

FIGS. 2B and 2C show some of the images forming the moving image. FIG. 2B is a map in which rotation indicated by an arrow B is performed from FIG. 2A at the beginning of the moving image, and FIG. 2C is a map in which rotation indicated by an arrow C is performed from FIG. 2B. In the present embodiment, since the speed of change in angle increases at the beginning of the moving image, the amount of change in the angle of the map per unit time gradually increases in the change process from FIGS. 2A to 2B.

In addition, in the present embodiment, after the speed of change in angle increases, the speed of change becomes constant, and thus, the change process from FIGS. 2B to 2C includes a period during which the speed of change is constant. Furthermore, in the present embodiment, at the ending of the moving image, the speed of change in angle decreases and then the change in display mode is completed, and thus, the amount of change in the angle of the map per unit time gradually decreases in the change process from FIGS. 2C to 2D. Hence, the possibility that the user loses track of how a road, etc., grasped by him/her have been changed on the map can be reduced at the beginning of the change in display mode, and the possibility that the user can recognize how the road, etc., grasped by him/her have been changed on the map can be improved at the ending.

Furthermore, in the example shown in FIGS. 2A to 2D, the position, on the display, of the current location included in the map changes with change in display mode. Namely, the reference position on the display where the current vehicle location overlaps changes in each of the maps shown in FIGS. 2A to 2D. In this example, the position, on the display, of the current location is moved downward by a distance L from FIGS. 2A to 2D (see FIG. 2D). In a configuration in which the position, on the display, of the current location included in the map thus changes with change in display mode, when, as shown in FIGS. 2A to 2D, the display mode gradually changes, the current vehicle location can be prevented from suddenly changing as if jumping, enabling to reduce the possibility that the user loses track of how a road, etc., grasped by him/her have been changed on the map. In addition, since the speed of change in display mode increases and then decreases, the occurrence of sudden start and completion of change in current location can be prevented. Therefore, the possibility that the user can recognize how the road, etc., grasped by him/her have been changed on the map can be improved.

(3) OTHER EMBODIMENTS

The above-described embodiment is one example for implementation, but various other embodiments can also be adopted as long as the speed of change in display mode increases after start of change in display mode. For example, a mobile unit that moves with the navigation system 10 is any, and may be a vehicle or may be a pedestrian, and various examples are assumed. In addition, a retrieval system may be an apparatus mounted on a vehicle, etc., or may be an apparatus implemented by a portable terminal, or may be a system implemented by a plurality of apparatuses (e.g., a client and a server).

Furthermore, at least one of the map display part 21*a*, the moving image display part 21*b*, and the speed-of-change control part 21*c* that form the retrieval system may be present divided into a plurality of apparatuses. Needless to say, a part of the configuration of the above-described embodiment may be omitted, or the sequence of processes may be changed or omitted.

The map display part displays a map including a current location on the display in any of a plurality of display modes. Namely, the map display part can display a map on the display in at least two display modes. The expression "the display mode is different" indicates that maps showing the same location have different images, and thus, the display mode is different unless maps are identical. Therefore, maps obtained before and after two-dimensionally rotating a given map are maps having different display modes, maps obtained before and after three-dimensionally rotating a map are also maps having different display modes, and a two-dimensional map and a three-dimensional map (bird's eye view) are maps having different display modes.

Note that, when a map can be represented two-dimensionally, a configuration may be such that the plurality of display modes include a plurality of modes having different relationships between a specific direction on the map and a reference direction on the display. An example of such a configuration includes a configuration in which the map display part switches between a map in which the north on the map is oriented in the upward direction on the display and a map in which a user's traveling direction on the map is oriented in the upward direction on the display.

In addition, when a map can be represented three-dimensionally, a configuration may be such that the plurality of display modes include a plurality of modes having different angles at which the map is looked down upon from the point of view. An example of such a configuration includes a configuration in which a bird's eye view in which an angle at which a map is looked down upon from the point of view (a downward angle from the horizontal: the angle of depression) is 0° to 90° can be displayed and the angle of depression can be switched. Note that, when the angle of depression is 90°, a map may be represented two-dimensionally.

FIGS. 3A to 3D show examples of maps represented by bird's eye views. In these drawings, icons $I_1$ to $I_4$ each represent a vehicle location, and icons $I_{d1}$ to $I_{d4}$ each indicate that a direction pointed by a black triangle is the north. In addition, in these drawings, roads are represented by thick lines, and the angle of a plane on the map is represented by thin lines. Namely, the thin lines are imaginary rectangles set on the plane on the map, and the angle of depression and the angle of the map are schematically represented by the shapes of the rectangles. The imaginary rectangles may not be or may be displayed in practice.

Figure 3A:
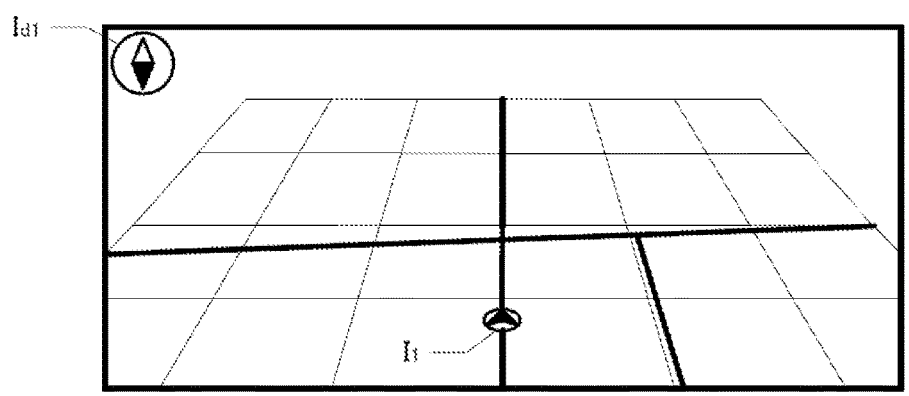
FIGS. 3A, 3B, 3C, and 3D are diagrams describing exemplary map display.

FIG. 3A shows a head-up map represented by a bird's eye view, in which a vehicle's traveling direction on the map is oriented in the upward direction of the display. Note that in the bird's eye view shown in FIG. 3A, the point of view is present at the rear and above the vehicle, and the angle of depression is a specific angle between 0° to 90°. FIG. 3D is a north-up map in which the north direction on the map is oriented in the upward direction of the display. This map may be a bird's eye view with an angle of depression of 90°, or may be a top view.

Such a bird's eye view can be created by, for example, the control part 20 rendering a virtual two-dimensional map based on the rendering data included in the map information 30*a*, setting the point of view and the angle of depression which are present above the map, and identifying an image projected onto a virtual screen which is set at an end of the line of sight for when a direction of the angle of depression is looked at from the point of view. Namely a bird's eye view can be created by the control part 20, for example, setting, on a line extending in the direction of the angle of depression from the point of view, a virtual rectangular screen perpendicular to the line, and projecting an image present at a point of intersection of an arbitrary line extending from a starting point to the map and the map, to a position where the line intersects the screen. Here, a map with an arbitrary angle of depression may be created in any manner as long as the map is created as a bird's eye view, and various techniques can be adopted. Note that in a bird's eye view, ground objects may be two-dimensionally represented on the map plane or may be three-dimensionally represented on the map plane.

Here, an example case in which the display mode changes from the bird's eye view shown in FIG. 3A to the north-up map shown in FIG. 3D will be described. Namely, when the user provides an instruction to change the display mode with the bird's eye view shown in FIG. 3A being displayed on the display of the user I/F part 44, the control part 20 creates a moving image showing the change from FIGS. 3A to 3D. Specifically, the control part 20 creates a moving image showing a process in which the angle of depression gradually increases and finally reaches 90° and the north direction on the map is gradually rotated and finally oriented in the upward direction of the display.

Figure 3B:
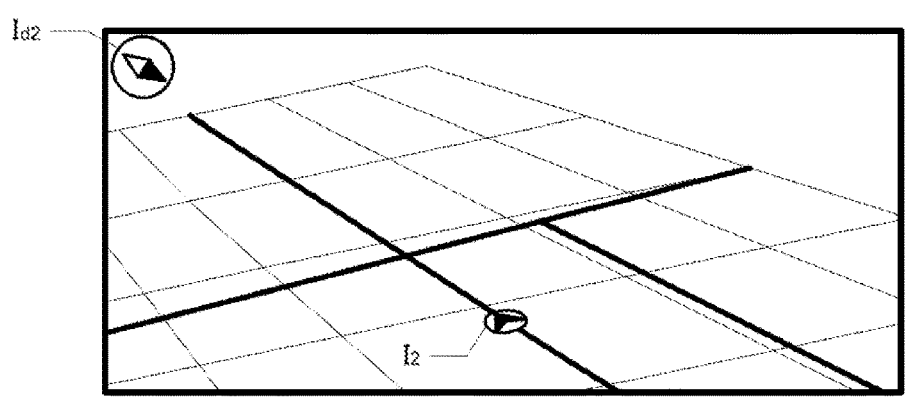
Figure 3C:
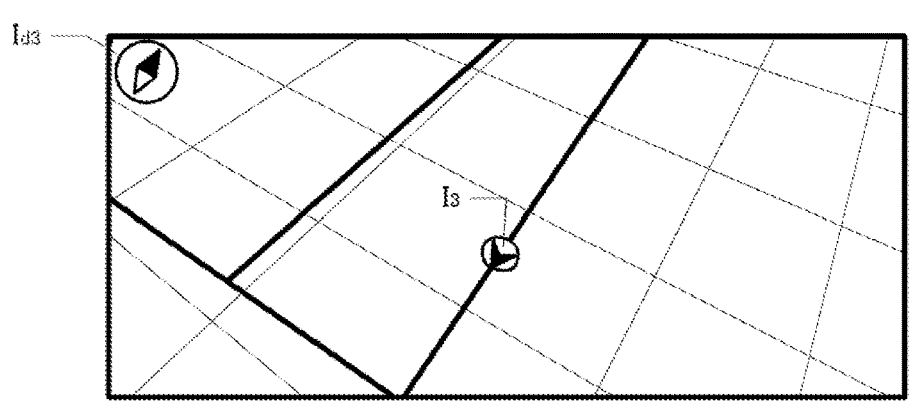
Figure 3D:
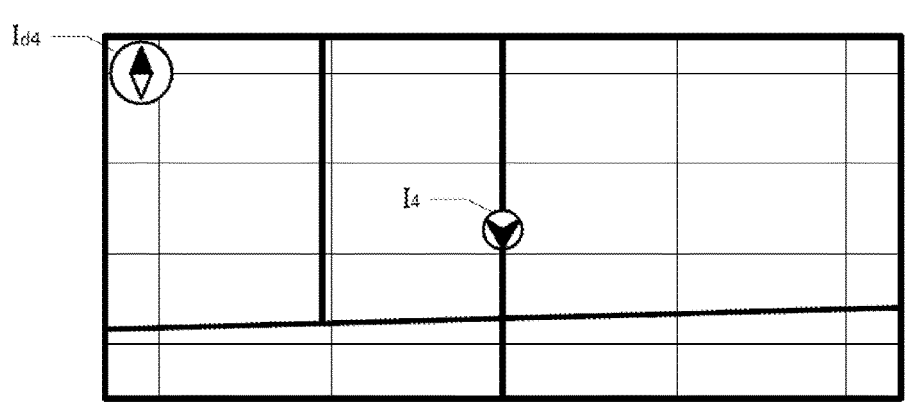

FIGS. 3B and 3C show some of the images forming the moving image. FIG. 3B is a map obtained at a certain time point after the angle of depression gradually increases from FIG. 3A (the map approaches two-dimensional display) and the north direction is gradually rotated counterclockwise at the beginning of the moving image. FIG. 3C is a map obtained at a certain time point after the angle of depression further increases from FIG. 3B and the north direction is further rotated counterclockwise. In the present embodiment, too, since the speed of change in angle increases at the beginning of the moving image, the amount of change in the angle of the map per unit time gradually increases in the change process from FIGS. 3A to 3B.

In addition, in the present embodiment, too, after the speed of change in angle increases, the speed of change becomes constant, and the change process from FIGS. 3B to 3C includes a period during which the speed of change is constant. Furthermore, in the present embodiment, too, at the ending of the moving image, the speed of change in angle decreases and then the change in display mode is completed, and thus, the amount of change in the angle of the map per unit time gradually decreases in the change process from FIGS. 3C to 3D. Hence, the possibility that the user loses track of how a road, etc., grasped by him/her have been changed on the map can be reduced at the beginning of change in display mode, and the possibility that the user can recognize how the road, etc., grasped by him/her have been changed on the map can be improved at the ending.

Furthermore, in the example shown in FIGS. 3A to 3D, the position, on the display, of the current location included in the map changes with change in display mode. As a result, the current vehicle location can be prevented from suddenly changing as if jumping, enabling to reduce the possibility that the user loses track of how a road, etc., grasped by him/her have been changed on the map. In addition, since the speed of change in display mode increases and then decreases, the occurrence of sudden start and completion of change in current location can be prevented. Therefore, the possibility that the user can recognize how the road, etc., grasped by him/her have been changed on the map can be improved.

The moving image display part may be configured in any manner as long as the moving image display part can display, when the display mode changes, a moving image in which a map is rotated and the display mode before being changed gradually changes to a changed display mode, on the display. Namely, the moving image display part may be configured in any manner as long as the moving image display part can display a moving image in which the display mode gradually changes, on the display by displaying maps showing the process of changing the display mode between a map displayed in a display mode before being changed and a map displayed in a changed display mode.

Images showing the process of changing the display mode may be created in any manner as long as the images are created such that the display mode gradually changes. For example, a configuration can be adopted in which a plurality of images are created that change such that a display mode before being changed approaches a changed display mode, and that are arranged in the order in which the degree of change increases. Such images can be created by, for example, changing a parameter used upon determining the display mode of a map.

When the rotation of a two-dimensional map is the change in display mode, a moving image can be created by creating images such that an angle between a specific direction on the map and a reference direction on the display gradually changes. When the change in angle at which a map is looked down upon from the point of view is the change in display mode, a moving image can be created by creating images such that the angle gradually changes. Needless to say, a moving image can be created by continuously switching between still images, and a parameter such as frame rate can adopt various values.

The speed-of-change control part may be configured in any manner as long as the speed-of-change control part can increase the speed of change in display mode after start of change in display mode. Namely, the speed-of-change control part may be configured in any manner as long as the speed-of-change control part can control a moving image such that change in display mode per unit time gradually increases after start of change in display mode. Adjustment of the speed of change in a moving image can be implemented by various techniques. For example, the adjustment may be implemented upon displaying a moving image by the moving image display part, or may be implemented upon creating a moving image.

The former one can adopt, for example, a configuration in which a moving image in which the speed of change increases is displayed by creating a plurality of images in which changes in display mode are constant in the process from after the start of change in display mode to the completion of the change, and increasing the frame rate after start of display of the moving image. The latter one can adopt, for example, a configuration in which a moving image in which the speed of change increases is displayed by creating a plurality of images in which change in display mode gradually increases in the process from after the start of change in display mode to the completion of the change, and displaying the images at the same frame rate after start of display of the moving image.

An increase in the speed of change may be implemented in any manner as long as the user is not given the impression that change in display mode is suddenly started, and acceleration can take various values. In addition, an increase in the speed of change may be implemented in any manner as long as the increase is implemented after start of change. For example, a configuration can be adopted in which the speed of change increases gradually immediately after start of change.

Furthermore, the speed-of-change control part may be configured to decrease the speed of change in display mode before completion of change in display mode. Namely, the speed-of-change control part may be configured in any manner as long as the speed-of-change control part can control a moving image such that change in display mode per unit time gradually decreases before completion of the change in display mode. Adjustment of the speed of change in a moving image can be implemented by various techniques. For example, as with an increase in speed, the adjustment may be implemented upon displaying a moving image by the moving image display part, or may be implemented upon creating a moving image.

According to the above-described configuration, in a moving image in which the display mode of a map gradually changes, the change in display mode is slower at the ending than earlier. Hence, the possibility that the user can recognize how a road, etc., grasped by him/her have been changed on the map can be improved. A decrease in the speed of change may be implemented in any manner as long as the user is not given the impression that change in display mode is suddenly completed, and acceleration can take various values. In addition, a decrease in the speed of change may be implemented in any manner as long as the decrease is implemented before completion of the change. For example, a configuration can be adopted in which the speed of change decreases gradually toward a point where the change is completed. Note that when both of an increase in the speed of change after start of change and a decrease in the speed of change before completion of the change are implemented, for example, a configuration can be adopted in which the speed of change increases immediately after start of the change, the increase in speed eventually ends, and thereafter the speed of change decreases and the change is completed.

Furthermore, a configuration may be such that the plurality of display modes include a plurality of modes having different positions, on the display, of current locations included in a map. Namely, the position, on the display, of the current location may change before and after change in display mode and in the change process. In this case, the speed of change at which the current location changes may increase or decrease, or may not increase or decrease.

Furthermore, a technique for increasing the speed of change in display mode after start of change in display mode as described above is also applicable as a program or a method. In addition, it can be assumed that a system, a method, and a program such as those described above are implemented as a single apparatus or implemented by a plurality of apparatuses, and thus, the system, method, and program include various modes. For example, it is possible to provide a navigation system, method, and program including means such as those described above. In addition, changes can be made as appropriate, e.g., a part is software and a part is hardware. Furthermore, the aspects described above may be embodied as a recording medium for a program that controls the system. Needless to say, the recording medium for software may be a magnetic recording medium or a magneto-optical recording medium, or even any recording medium to be developed in the future can also be considered exactly in the same manner.

REFERENCE SIGNS LIST

10: Navigation system, 20: Control part, 21: Navigation program, 21a: Map display part, 21b: Moving image display part, 21c: Speed-of-change control part, 30: Recording medium, 30a: Map information, 41: GPS receiving part, 42: Vehicle speed sensor, 43: Gyro sensor, and 44: User I/F part

The invention claimed is:

1. A navigation system comprising:
a map display part that displays a map on a display in any of a plurality of display modes, the map including a current location;
a moving image display part that displays, when the display mode changes, a moving image in which the map is rotated and the display mode before being changed gradually changes to a changed display mode, on the display; and
a speed-of-change control part that increases a speed of change in the display mode after start of the change in the display mode.

2. The navigation system according to claim 1, wherein the speed-of-change control part decreases the speed of change in the display mode before completion of the change in the display mode.

3. The navigation system according to claim 1, wherein the plurality of display modes include a plurality of modes having different relationships between a specific direction on the map and a reference direction on the display.

4. The navigation system according to claim 1, wherein the plurality of display modes include a plurality of modes having different angles at which the map is looked down upon from a point of view.

5. The navigation system according to claim 1, wherein the plurality of display modes include a plurality of modes having different positions, on the display, of the current location.

6. A non-transitory computer readable medium storing a navigation program causing a computer to function as:
a map display part that displays a map on a display in any of a plurality of display modes, the map including a current location;
a moving image display part that displays, when the display mode changes, a moving image in which the map is rotated and the display mode before being changed gradually changes to a changed display mode, on the display; and
a speed-of-change control part that increases a speed of change in the display mode after start of the change in the display mode.

* * * * *